United States Patent [19]

Koleske

[11] Patent Number: 4,707,535

[45] Date of Patent: * Nov. 17, 1987

[54] LOW VISCOSITY ADDUCTS OF A POLY(ACTIVE HYDROGEN) ORGANIC COMPOUND AND POLYEPOXIDE

[75] Inventor: Joseph V. Koleske, Charleston, W. Va.

[73] Assignee: Union Carbide Corporation, Danbury, Conn.

[*] Notice: The portion of the term of this patent subsequent to Dec. 16, 2003 has been disclaimed.

[21] Appl. No.: 546,114

[22] Filed: Oct. 27, 1983

[51] Int. Cl.[4] .................. C08G 59/00; C08G 59/68; C08G 65/04; C08G 59/40
[52] U.S. Cl. .................. 528/110; 528/405; 528/406; 528/409; 528/410; 528/411; 528/412; 528/413; 528/414; 528/297; 528/365; 528/76; 528/79; 528/80; 252/182; 568/623; 568/606; 560/198
[58] Field of Search .............. 528/405, 406, 408–414, 528/110, 297, 365, 76, 79, 80; 252/182; 568/623, 606; 560/198

[56] References Cited

U.S. PATENT DOCUMENTS

| | | | |
|---|---|---|---|
| 2,830,031 | 4/1958 | Fisch | 528/110 |
| 3,318,822 | 5/1967 | Batzer et al. | 528/405 |
| 3,398,102 | 8/1968 | Soldatos et al. | 528/406 |
| 3,772,326 | 11/1973 | Batzer et al. | 528/405 |
| 3,896,303 | 7/1975 | Gerkin et al. | 528/66 |
| 3,907,719 | 9/1975 | Habermeier et al. | 528/406 |
| 3,948,916 | 4/1976 | Ponet et al. | 528/406 |
| 4,045,474 | 8/1977 | Taller et al. | 528/83 |

FOREIGN PATENT DOCUMENTS 582526 9/1959 Canada .................. 528/406

*Primary Examiner*—John Kight
*Assistant Examiner*—Dennis R. Daley
*Attorney, Agent, or Firm*—J. B. Mauro

[57] ABSTRACT

This invention is directed to adducts of a poly(active hydrogen) organic compound and a polyepoxide comprising the reaction product of a poly(active hydrogen) organic compound and a polyepoxide containing two or more epoxy groups per molecule, said poly(active hydrogen) organic compound being employed in an amount at least sufficient to effect substantially complete reaction of the epoxy groups of the polyepoxide. The adducts are useful in the formulation of high solids coating compositions, polyurethane elastomers, inks, sealants, adhesives and the like.

39 Claims, No Drawings

LOW VISCOSITY ADDUCTS OF A POLY(ACTIVE HYDROGEN) ORGANIC COMPOUND AND POLYEPOXIDE

BRIEF SUMMARY OF THE INVENTION

1. Technical Field

This invention is directed in general to low viscosity adducts of a poly(active hydrogen) organic compound and a polyepoxide and a process for the preparation thereof, which adducts are useful for the formulation of high solids coatings, polyurethane elastomers, inks, sealants, adhesives and the like.

2. Background Art

Products prepared from the reaction of a polycaprolactone polyol and a polyepoxide are known in the art. See, for example, U.S. Pat. No. 3,896,303 to Gerkin and Comstock. One of the disadvantages associated with many products prepared in the prior art is their relatively high viscosities, which present problems in their manufacture and use. The use of these high viscosity products in the preparation of curable high solids coatings oftentimes necessitates the addition of solvents, resulting in curable coating compositions which may not necessarily be curable high solids coating compositions. The amount of organic solvents present in curable high solids coating compositions should be minimal which results in little or no atmospheric pollution during the curing process of the coating composition.

In the absence of such viscosity-reducing solvents, the high viscosity of many of these curable coating compositions prepared in the prior art precludes the application thereof to suitable substrates by conventional techniques such as roll coating, spray and other methods of application. Further, the solvents must be volatilized at some point during the curing process and such volatilization will expend additional energy, waste raw materials and negate the atmospheric pollution benefits of high solids coatings. This is significant in that governmental regulations have placed ever increasing restrictions on the amounts and types of organic volatiles permitted to escape into the atmosphere from coating compositions.

U.S. Pat. No. 3,896,303 to Gerkin and Comstock discloses high viscosity polyol compositions prepared by the reaction of (1) a caprolactone polyol having an average of at least three hydroxyl groups per molecule and (2) a polyepoxide having at least two vicinal epoxy groups per molecule. See Comparative Example A herein and also Control 5 in U.S. Pat. No. 4,045,474. These high viscosity polyol compositions can be reacted with aliphatic polyisocyanates to produce polyurethane coatings useful in high performance applications. Such coatings exhibit the characteristics of high hardness, good impact resistance, low temperature flexibility and chemical resistance.

U.S. Pat. No. 4,045,474 to Taller and Elder describes high functionality polyol compositions having a viscosity of less than 5000 centistokes at 54.5° C. and an equivalent weight of at least 150. See Comparative Examples B through E herein. These high functionality polyol compositions are prepared by reacting (1) at least two polycaprolactone polyols differing in average hydroxyl number by an amount of from 250 to 400 and having average hydroxyl numbers of from about 180 to about 600 and (2) a cycloaliphatic diepoxide. Such polyol compositions can be used with particular advantage in forming light stable polyurethane coatings having a good balance of hardness, flexibility and abrasion resistance as well as weatherability and chemical resistance.

DISCLOSURE OF THE INVENTION

It has been found as a result of the present invention that adducts of a poly(active hydrogen) organic compound and a polyepoxide can be prepared which have both a low oxirane content and a low viscosity. The low viscosity adducts of this invention can be blended with suitable crosslinking agents such as polyepoxides, polyisocyanates, melamine formaldehydes, urea formaldehydes, benzoguanamine formaldehydes and the like and made into curable high solids coating compositions which require little or no organic solvent to improve flowability during application by conventional methods to a suitable surface or substrate. Cured coatings prepared from these curable high solids coating compositions containing a low viscosity adduct of a poly(active hydrogen) organic compound and a polyepoxide exhibit highly desirable coating properties.

In one embodiment the present invention is directed to low viscosity adducts of a poly(active hydrogen) organic compound and a polyepoxide comprising the reaction product of a poly(active hydrogen) organic compound and a polyepoxide containing two or more epoxy groups per molecule, said poly(active hydrogen) organic compound being employed in an amount at least sufficient to effect substantially complete reaction of the epoxy groups of the polyepoxide.

In another embodiment the present invention is directed to a process for preparing low viscosity adducts of a poly(active hydrogen) organic compound and a polyepoxide which process comprises reacting a poly(active hydrogen) organic compound and a polyepoxide containing two or more epoxy groups per molecule in the presence of a sulfonic acid catalyst or derivative thereof at a temperature of from about 80° C. to about 225° C., said poly(active hydrogen) organic compound, polyepoxide and sulfonic acid catalyst or derivative thereof being employed in an amount at least sufficient to effect substantially complete reaction of the epoxy groups of the polyepoxide in a sufficiently short period of time whereby to minimize the formation of a high viscosity product.

The low viscosity adducts of this invention can be blended with polyepoxides, polyisocyanates melamine formaldehydes, urea formaldehydes, benzoguanamine formaldehydes and the like to provide low viscosity curable high solid coating compositions which, after cure, give high performance coatings having improved properties such as improved flexibility and toughness of the coating. In addition to their usefulness as high solids coating compositions, the adducts of a poly(active hydrogen) organic compound and a polyepoxide of the present invention are also useful in the formulation of polyurethane elastomers, inks, sealants, adhesives and the like.

Copending U.S. patent application Ser. No. 546,113, filed on an even date herewith, describes adducts of a polycaprolactone polyol and a polyepoxide comprising the reaction product of at least one polycaprolactone polyol and a polyepoxide containing two or more epoxy groups per molecule in a molar ratio of polycaprolactone polyol to polyepoxide of from about 2:1 to about 3:1, said adducts having an oxirane content of less than about 0.10 percent and a viscosity of less than about 3700 centistokes at 54.5° C. The adducts are useful in the formulation of high solids coating compositions, polyurethane elastomers, inks, sealants, adhesives and the like.

Copending U.S. patent application Ser. No. 546,112, filed on an even date herewith, is directed to adducts of at least two poly(active hydrogen) organic compounds and a polyepoxide comprising the reaction product of at least two poly(active hydrogen) organic compounds differing as to classification and a polyepoxide containing two or more epoxy groups per molecule, said poly(active hydrogen) organic compounds being employed in an amount at least sufficient to effect substantially complete reaction of the epoxy groups of the polyepoxide. The adducts are useful in the formulation of high solids coating compositions, polyurethane elastomers, inks, sealants, adhesives and the like.

DETAILED DESCRIPTION

The poly(active hydrogen) organic compound that is reacted with the polyepoxide containing two or more epoxy groups to produce the adduct compositions of this invention include any compatible organic compound containing two or more active hydrogen atoms per molecule. The poly(active hydrogen) organic compounds are well known to those skilled in the art and include, for example, organic polyols and the like.

Substantially any of the organic polyols known in the art can be used and are preferred as the poly(active hydrogen) organic compounds in this invention. However, to differentiate this invention, the language "poly(active hydrogen) organic compounds" means, as used in the claims hereof and hereinafter, an organic compound which contains more than one active hydrogen and excludes polycaprolactone polyols wherein the active hydrogen is provided by a caprolactone moiety or a moiety which is directly bonded to a caprolactone moiety and is a starter compound in making the polycaprolactone polyol. Illustrative of the polyols useful in producing adduct compositions in accordance with this invention are the polyether polyols such as polyhydroxyalkanes and polyoxyalkylene polyols, the acrylic and vinyl polyols, the polyester polyols, the polycarbonate polyols, and the like. Among the polyether polyols which can be employed are those selected from one or more of the following classes of compositions, alone or in admixture with other polyether polyols, known to those skilled in the art:

(a) Alkylene oxide adducts of polyhydroxyalkanes;

(b) Alkylene oxide adducts of non-reducing sugars and sugar derivatives;

(c) Alkylene oxide adducts of phosphorus and polyphosphorus acids;

(d) Alkylene oxide adducts of polyphenols;

(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyether polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

The alkylene oxide adducts of phosphorus and polyphosphorus acids are another useful class of polyether polyols. Ethylene oxide, 1,2-epoxypropane, the epoxybutanes, 3,-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A still further useful class of polyether polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl) propanes, condensation products of various phenolic compounds and acrolein; the simpliest member of this class being the 1,1,3-tris (hydroxyphenyl) propanes, condensation products of various phenolic compounds and glyoxal, glutaraldehyde, and othe rdialdehydes, the simplest members of this class being the 1,1,2,2,-tetrakis(hydroxyphenol) ethanes, and the like.

The polyether polyols described hereinabove can have hydroxyl numbers which vary over a wide range. In general, the hydroxyl numbers of the above described polyols employed in this invention can range from about 15, and lower, to about 900, and higher. The hydroxyl number is defined as the number of milligrams of potassium hydroxide required for the complete neutralization of the fully phthalated derivative prepared from 1 gram of polyol. The hydroxyl number can also be defined by the equation:

$$OH = 56.1 \times 1000 \times f/m.w.)$$

where

OH = hydroxyl number of the polyol;

f = functionality, that is, average number of hydroxyl groups per molecule of polyol; and m.w = molecular weight of the polyol.

The polyether polyols described hereinabove can be prepared by conventional methods and are commercially available from a number of manufacturers.

Other preferred representative examples of organic polyols that may be employed in the adduct compositions of this invention include polycarbonate polyols; copolymers of hydroxypropyl and hydroxy-ethyl acrylates and methacrylates with other free radical-polymerizable monomers such as acrylate esters, vinyl halides, vinyl acetate or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; branched polyhydroxy functional hydrocarbon polyols such as those obtained by the hydroformylation of oleyl alcohol and the further condensation with formaldehyde to give the following structure:

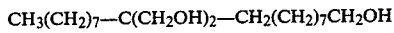

and adipate polyesters prepared by condensation polymerization of such polyols with adipic acid; hydroxy terminated polyesters and hydroxy terminated polyalkadienes. The polyester polyols are the reaction products of polyfunctional organic carboxylic acids and polyhydric alcohols and include, for example, poly(hexamethylene adipate), poly(ethylene adipate), poly(butylene adipate) and the like. The polyester polyols can be used alone or in admixture with other polyester polyols. Many of these organic polyols can be prepared by conventional methods and are commercially available from a number of manufacturers such as polycarbonate polyols commercially available from PPG Industries, Inc., as Duracarb 120, 122, 124, 140 and 142; polyvinylacetal resins commercially available from Monsanto Chemical Company as Butvar B-72A, B-73, B-76, B-90 and B-98 and as Formvar 7/70, 12/85, 7/95S, 7/95E, 15/95S and 15/95E; an aliphatic polyester diol commercially available from Rohm and Haas as Paraplex U-148; saturated polyester polyols commercially available from Mobay Chemical Company as Multron R-2, R-12A, R-16, R-18, R-38, R-68, and R-74; a hydroxypropylated cellulose having an equivalent weight of approximately 100 commercially available from Hercules, Inc. as Klucel E; and a cellulose acetate butyrate ester having a hydroxyl equivalent weight of approximately 400 commercially available from Eastman Kodak as Alcohol Soluble Butyrate.

The most preferred classes of polyols employed in the adduct compositions of this invention are the dihydroxyl functional polytetramethylene oxide polyols such as Polymeg 650, 1000 and 2000 commercially available from Quaker Oats Company, and, of course, the ethylene oxide and propylene oxide adducts including ethylene glycol, diethylene glycol, the poly(oxyethylene) glycols, the poly(oxypropylene) glycols, triols and higher functionality polyols such as LHT-67, LHT-112, and LG-56 commercially available from Union Carbide Corporation. An alkylene oxide derived polyol suitable for use in the adduct compositions of this invention has the following formula:

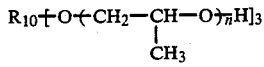

wherein $R_{10}$ is alkane of 3 to 10 carbon atoms, preferably 3 carbon atoms, and n is an integer of from about 10 to about 75. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, such as the propylene oxide polyols capped with ethylene oxide, i.e., NIAX Polyol 11-27 and 11-34 and E-474, commercially available from Union Carbide Corporation, or may be randomly distributed along the polymer chain. As is well known in the art, the alkylene oxide polyols that are preferred herein contain varying small amounts of unsaturation.

Unsaturation in itself does not affect in any adverse way the formation of the coating compositions in accordance with the present invention.

The polyepoxides, alone or in admixture, which may be used to prepare the adduct compositions of this invention contain two or more epoxy groups having the formula:

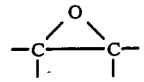

The epoxy groups can be terminal epoxy groups or internal epoxy groups. The polyepoxides are preferably cycloaliphatic epoxides. Polyglycidyl epoxides can also be used to prepare the adduct compositions of this invention. The polyepoxides are reacted with the above-described poly(active hydrogen) organic compounds to produce the novel adduct compositions of this invention.

Suitable cycloaliphatic epoxide resins for purposes of this invention are those having an average of two or more epoxy groups per molecule. Illustrative of suitable cycloaliphatic epoxides are the following:

FORMULA I

Diepoxides of cycloaliphatic esters of dicarboxylic acids having the formula:

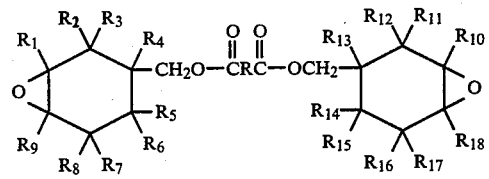

wherein $R_1$ through $R_{18}$, which can be the same or different, are hydrogen or alkyl radicals generally containing one to nine carbon atoms inclusive, and preferably containing one to three carbon atoms, inclusive, as for example methyl, ethyl, n-propyl, n-butyl, n-hexyl, 2-ethylhexyl, n-octyl, n-nonyl and the like; R is a valence bond or a divalent hydro carbon radical generally containing one to twenty carbon atoms, inclusive, and preferably, containing four to six carbon atoms, inclusive, as for example, alkylene radicals, such as trimethylene, tetramethylene, pentamethylene, hexamethylene, 2-ethylhexamethylene, octamethylene, nonamethylene, hexadecamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_{18}$ are hydrogen and R is alkylene containing four to six carbon atoms.

Among specific diepoxides of cycloaliphatic esters of dicarboxylic acids are the following:
bis(3,4-epoxycyclohexylmethyl)oxalate.
bis(3,4-epoxycyclohexylmethyl)adipate.
bis(3,4-epoxy-6-methylcyclohexylmethyl)adipate.
bis(3,4-epoxycyclohexylmethyl)pimelate, and the like.

Other suitable compounds are described in, for example, U.S. Pat. No. 2,750,395.

FORMULA II

A 3,4-epoxycyclohexylmethyl-3,4-epoxycyclohexane carboxylate having the formula:

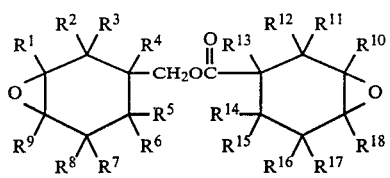

wherein $R^1$ through $R^{18}$ which can be the same or different are as defined for $R_1$ through $R_{18}$ in Formula I. Particularly desirable compounds are those wherein $R^1$ through $R^{18}$ are hydrogen.

Among specific compounds falling within the scope of Formula II are the following: 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxy-cyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate. Other suitable compounds are described in, for example, U.S. Pat. No. 2,890,194.

FORMULA III

Diepoxides having the formula:

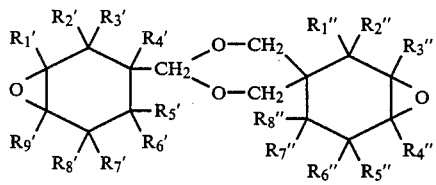

wherein the R single and double primes, which can be the same or different, are monovalent substituents such as hydrogen, halogen, i.e. chlorine, bromine, iodine or fluorine, or monovalent hydrocarbon radicals, or radicals as further defined in U.S. Pat. No. 3,318,822. Particularly, desirable compounds are those wherein all the R's are hydrogen.

Other suitable cycloaliphatic epoxides are the following:

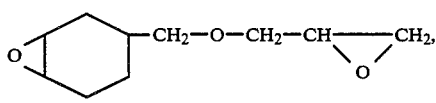

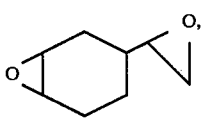

and the like

The preferred cycloaliphatic epoxides are the following:

3,4-Epoxycyclohexylmethyl-3,4-Epoxycyclohexane carboxylate

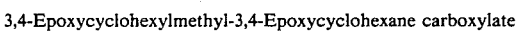
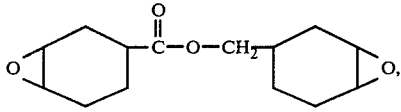

Bis(3,4-Epoxycyclohexylmethyl)adipate

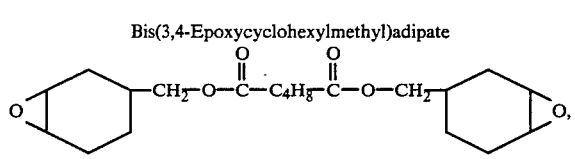

2-(3,4-Epoxycyclohexyl-5,5-spiro-3,4-epoxy)cyclohexane-meta-dioxane

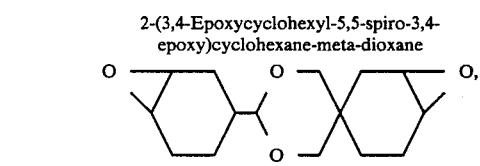

Vinylcyclohexane diepoxide

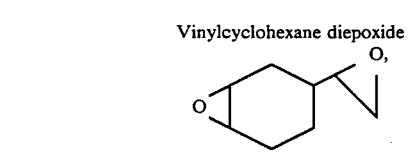

or mixtures thereof.

Suitable polyglycidyl epoxides for purposes of this invention include epoxides with six membered ring structures such as diglycidyl esters of phthalic acid, partially hydrogenated phthalic acid or fully hydrogenated phthalic acid, the diglycidyl esters of hexahydrophthalic acids being preferred. A representative diglycidyl ester of phthalic acid is the following:

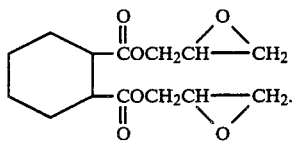

The polyglycidyl-type epoxides are preferably diglycidyl ethers of bisphenol A which are derived from bisphenol A and epichlorohydrin and have the following formula:

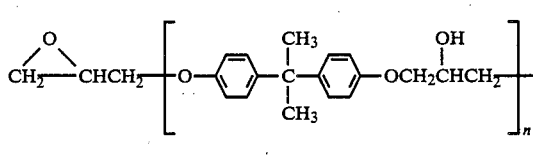
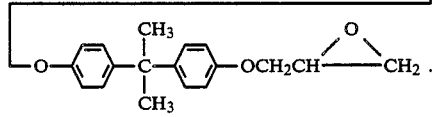

The cresol-novolac epoxy resins are multifunctional, solid polymers characterized by low ionic and hydrolyzable chlorine impurities, high chemical resistance, and thermal performance.

The epoxy phenol novolac resins are generally of the following formula:

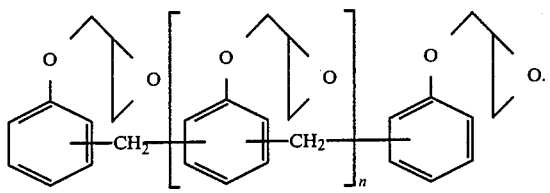

The polynuclear phenol-glycidyl ether-derived resins are generally of the formula:

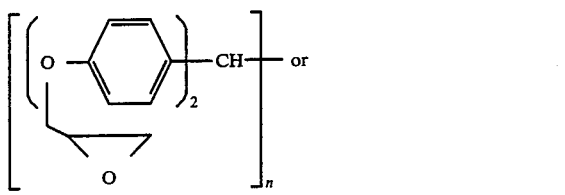

Among the aromatic and heterocyclic glycidyl amine resins which may be included herein are the following: tetraglycidylmethylenedianiline derived resins of the following formula:

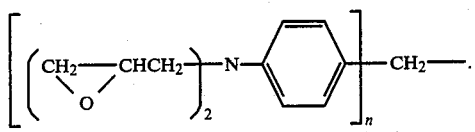

Triglycidyl-p-aminophenol derived resins, triazine based resins and hydantion epoxy resins of the formula:

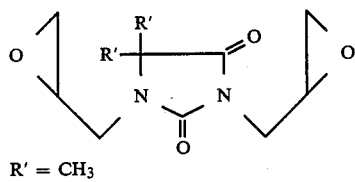

R' = CH₃

Mixtures of cycloaliphatic epoxides and polyglycidyl epoxides can also be used to prepare the adduct compositions of this invention.

The adducts of this invention are prepared by reacting a poly(active hydrogen) organic compound and a polyepoxide in a molar ratio of poly(active hydrogen) organic compound to polyepoxide of from about 1.5:1 or less to about 4:1 or more, preferably from about 2:1 to about 3:1. Such a preferred molar ratio range provides from about 1 to about 1.5 moles of poly(active hydrogen) organic compound for each equivalent of epoxide present in the reaction mixture. The most preferred molar ratio of poly(active hydrogen) organic compound to polyepoxide for many adducts is about 2.5:1. It is to be understood that, provided the reaction system contains sufficient free hydroxyl groups to effect substantially complete reaction of the epoxy groups of the polyepoxide, mole ratios encompassing limits outside of the above ranges may be employed without departing from the scope of this invention.

The adducts of this invention are prepared by reacting a poly(active hydrogen) organic compound and a polyepoxide in the presence of a sulfonic acid catalyst or derivative thereof. The preferred sulfonic acid catalysts and derivatives thereof include trifluoromethanesulfonic acid (triflic acid) and salts of sulfonic acid which have general formula:

$$(R_fSO_3)_nM$$

wherein $R_f$ is fluoroalkyl (preferably perfluoroalkyl) having, for example, 1 to 18 carbons and preferably 1 to 8 carbons, M is ammonium ($-NH_4$), quaternary ammonium, cation of amine (i.e., a protonated amine), or preferably a mono- or polyvalent cation, preferably having a valence of 1–5, of a metal selected from the group consisting of metals of Groups I to V and VIII, subgroups VIB and VIIB, and those of the lanthanide and actinide series of the Periodic Table, and n is an integer equal to the valence of M. Such preferred sulfonic acid catalysts and derivatives thereof are more fully described in U.S. Pat. No. 3,842,019.

Preferred amine triflates which can be used as catalysts in the present invention include
$CF_3SO_3H\cdot N(C_6H_5)$, $CF_3SO_3H\cdot NH_3$,
$CF_3SO_3H\cdot CH_3NH_2$, $CF_3SO_3H\cdot (CH_3)_3N$,
$CF_3SO_3H\cdot C_2H_5NH_2$, $CF_3SO_3H\cdot$
$(C_2H_5)_2NH$, $CF_3SO_3H\cdot (C_2H_5)_3N$,
$CF_3SO_3H\cdot (i\text{-}C_3H_7)_2NH$, $CF_3SO_3H\cdot$
$(i\text{-}C_3H_7)_2N\,(C_2H_5)$, $CF_3SO_3H\cdot$
$(i\text{-}C_3H_7)_2N\,(C_2H_4OH)$, $CF_3H\cdot H_2N$
$(C_2H_4OH)$, $CF_3SO_3H\cdot HN\,(C_5\,H_8O)$,
$CF_3SO_3H\cdot H_2NC(CH_3)_2CH_2OH$, $CF_3SO_3H\cdot$
$HN(C_6H_{11})$, $CF_3SO_3H\cdot HN(C_2H_4OH)_2$,
$CF_3SO_3^-\ C.H_3)_4N$ and the like, including mixtures thereof.

Preferred metal salts of sulfonic acid which can be used as catalysts in the present invention include the metal salts of $CF_3SO_3H$,
$C_8F_{17}SO_3H$, $CF_3C_6F_{10}SO_3H$,
$C_3F_7SO_3H$, $C_2F_5SO_3H$, $C_2HF_4SO_3H$,
$C_3F_7CHFCF_2SO_3H$, $(CF_3)_2CHCF_2SO_3H$,
$C_4F_7\ SO_3H$, $(CF_3)_2CF(CF_2)_4SO_3H$,
$C_4F_CFHCF_2SO_2H$,
$C_3H_7CH(CF_3)CF_2SO_3H$, $C_{11}F_{23}SO_3H$,
$C_5H_{11}CFHCF_2SO_3H$, $C_7F_{15}CFHCF_2SO_3H$,
and the like, including mixtures thereof. Representative of the metal cations of such metal salts are those of the metals lithium, sodium, potassium, magnesium, calcium, strontium, barium, yitrium, vanadium, manganese, cobalt, nickel, copper, silver, zinc, cadmium, mercury, lead, bismuth, tungsten, lanthanum, neodymium, tin and gadolinium.

Other sulfonic acids and their derivatives can also be used to prepare the adducts of the present invention and include para-toluene sulfonic acid, dinonylnaphthylene sulfonic acid, alkyl sulfonic acids and the like.

The sulfonic acid metal salts used in this invention can be prepared by simply neutralizing the sulfonic acid precursors with a metal oxide, hydroxide, or carbonate or metal salt. The amino and ammonium salts can be formed by neutralization of the sulfonic acids with a salt-forming primary, secondary or tertiary amine, ammonia, or quaternary ammonium hydroxide. These latent forms of the sulfonic acid catalysts can be activated by heating them in the presence of the poly(active hydrogen) organic compound and polyepoxide to generate the sulfonic acid in its free acid form to make it available for catalyzing the reaction.

The sulfonic acid catalysts and derivatives thereof can be used in amounts varying from about 1 ppm to about 10,000 ppm or even greater (from about 0.0001 weight percent to about 1.0 weight percent based on the total charge of ingredients used in formulating the adduct compositions). The preferred concentration of sulfonic acid catalyst and derivatives thereof ranges from about 5 ppm to about 5000 ppm (from about 0.0005 weight percent to about 0.5 weight percent based on the total charge of ingredients used in formulating the adduct compositions). The most preferred concentration of sulfonic acid catalyst and derivatives thereof used in this invention ranges from about 50 ppm to about 4000 ppm (from about 0.005 weight percent to about 0.4 weight percent based on the total charge of ingredients used in formulating the adduct compositions).

The most preferred sulfonic acid catalysts and derivatives thereof useful in preparing the adduct compositions of the present invention include diethylammonium triflate, trifluoromethanesulfonic acid, ammonium triflate, di-isopropyl-ethyl ammonium triflate and di-isopropyl ammonium triflate. Some of these catalysts are commercially available from the 3M Company.

The adducts of this invention are prepared by reacting a poly(active hydrogen) organic compound and a polyepoxide in the presence of a sulfonic acid catalyst or derivative thereof at a temperature of from about 80° C. to about 225° C., preferably from about 100° C. to about 200° C., and most preferably from about 125° C. to about 190° C. The reaction proceeds satisfactorily at substantially atmospheric pressure under an inert atmosphere. However, elevated or subatmospheric pressures may be used. As is known to those skilled in the art, the time required to complete the reaction will depend on the catalyst concentration and the temperature of the reaction mixture. As exemplified in the present invention, the time can vary from one hour or less to about 6 hours or longer depending on the conditions chosen. It is preferred to complete the reaction in as short a time as possible without using excessive amounts of catalyst. Preferably, the reaction is complete in about 5 hours or less and, most preferably, the reaction is complete in about 2 hours or less.

A preferred method for preparation of the adducts of this invention comprises adding a poly(active hydrogen) organic compound to a reactor, heating the poly(active hydrogen) organic compound to a temperature of about 100° C. and adding the sulfonic acid catalyst or derivative thereof using a nitrogen sparge as soon as the poly(active hydrogen) organic compound is molten. The poly(active hydrogen) organic compound and catalyst mixture is then heated to a temperature of from about 130° C. to about 200° C. and a polyepoxide is added to the mixture. An exotherm that increases the temperature about 10° C.–20° C. or more may be encountered under certain reaction conditions. It has been found that this exotherm is beneficial in driving the reaction to completion in a short time. The reaction is carried out for about one hour to about three hours or until the oxirane content has been reduced to almost a nil value. A modification of this process can involve initially adding all of the ingredients into the reactor. A further modification of this method can involve a vacuum treatment of from 10 to 30 minutes after the catalyst addition and/or the use of vacuum during the heating of the poly(active hydrogen) organic compound to a molten state.

It is believed that during the reaction of the mixture of poly(active hydrogen) organic compound(s) and polyepoxide(s) at least a major portion of the individual poly(active hydrogen) organic compound molecules react with only one epoxide group of the polyepoxide such that the equivalent of one hydroxyl group of the poly(active hydrogen) organic compound reacts with a single epoxy group to open the oxirane ring to form a hydroxyl group on one of the oxirane carbon atoms, and a ether linkage with the second oxirane carbon atom and a carbon atom of the poly(active hydrogen) organic compound. The following equation illustrates the reaction of two moles of a polyether polyol with one mole of a cyclohexene diepoxide:

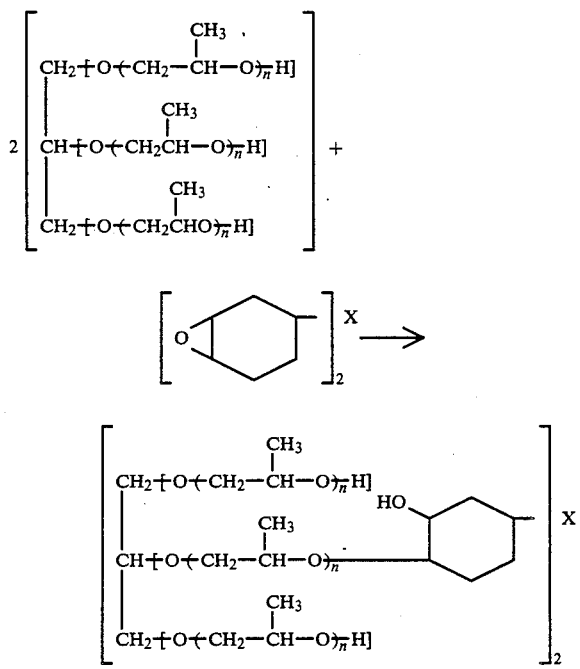

In the above equation, X is any of the divalent groups that links the two 3,4-epoxycyclohexyl nuclei such as —CH$_2$OOC—, —CH$_2$OOC(CH$_2$)$_4$COOCH$_2$— or —C(CH$_3$)$_2$—. The value of n may be any integer of from about 5 to about 25. It is to be understood that the structure of the product shown in the above equation is illustrative only and that any of the three hydroxyl groups of the polyether polyol may react to open the oxirane groups of the polyepoxide reactant.

The above equation represents a theoretical norm. However, additional species of longer chain length can be present in the reaction product as a result of reactions of the hydroxyl groups of the product shown with unreacted oxirane groups during the reaction. Moreover, additional reaction mechanisms, such as the reaction of hydroxyl groups of unreacted polyether polyols with the ester linkage of the polyepoxide, may account for other long chain components in the reaction product. The presence of these long chain components can result in an increase in product viscosity, and it is desirable to minimize their formation.

With a highly efficient sulfonic acid catalyst or derivative thereof as used in the present invention which minimizes the time that unreacted, partially reacted and fully reacted poly(active hydrogen) organic compound and polyepoxide molecules are in contact with each other during the reaction period, shorter chain length products of low viscosity such as those illustrated in the above equation are favored. The longer the poly(active hydrogen) organic compound and polyepoxide reactants are in contact before the oxirane is consumed, the greater is the possibility of building high molecular weight adducts and having a high viscosity product. It is believed that the sulfonic acid catalyst and derivatives thereof used in the present invention reduce the oxirane content of the reaction mixture to a nil or extremely low value in a short period of time to give a predominance of shorter chain length products such as those illustrated in the above equation and therefore a low viscosity adduct.

A low oxirane content indicates that a major portion of the epoxide groups of the polyepoxide have reacted with a hydroxyl group of a poly(active hydrogen) organic compound to open the oxirane ring to form a hydroxyl group on one of the oxirane carbon atoms and an ether linkage with the second oxirane carbon atom and a carbon atom of the poly(active hydrogen) organic compound. Achieving such a low oxirane content in a short period of time is believed to give a predominance of shorter chain length, low viscosity, high functionality adducts such as those illustrated in the above equation. A high oxirane content indicates that a major portion of the epoxide groups of the polyepoxide have not reacted with a hydroxyl group of a poly(active hydrogen) organic compound.

The adducts of the present invention preferably have an oxirane content of less than about 0.10 percent and a viscosity of less than about 5000 centistokes at 54.5° C., more preferably an oxirane content of less than about 0.05 percent and a viscosity of less than about 3500 centistokes at 54.5° C., and most preferably an oxirane content of less than about 0.025 percent and a viscosity of less than about 3000 centistokes at 54.5° C. Many adducts exemplified in the present invention have an oxirane content of less than about 0.025 percent and a viscosity of less than about 1000 centistokes at 54.5° C. If desired, the reaction time can be increased so as to provide an essentially nil oxirane content.

However, the adducts of the present invention can have an oxirane content of greater than about 0.10 percent and a viscosity of greater than about 5000 centistokes at 54.5° C. The adducts such as those prepared from certain polyglycidyl epoxides can preferably have an oxirane content of less than about 1.0 percent and a viscosity of less than about 25,000 centistokes at 54.5° C., more preferably an oxirane content of less than about 0.5 percent and a viscosity of less than about 15,000 centistokes at 54.5° C., and most preferably an oxirane content of less than about 0.25 percent and a viscosity of less than about 10,000 centistokes at 54.5° C.

The adducts of the present invention are particularly useful in the formulation of high solids coating compositions. Such curable coating compositions preferably comprise an adduct of a poly(active hydrogen) organic compound and a polyepoxide of the present invention, a polyepoxide containing two or more epoxy groups per molecule, and a catalyst or photoinitiator. Other additives such as surfactants, solvents, substituted cycloaliphatic monoepoxide reactive diluents and the like can also be included in the curable high solids coating compositions as more fully described below.

Any of the adducts of a poly(active hydrogen) organic compound and a polyepoxide of the present invention are useful in formulating the curable high solids coating compositions. The concentration of the adduct in the curable high solids coating compositions can range from about 1 to about 60 weight percent, preferably from 5 to 40 weight percent and most preferably from 10 to 30 weight percent of the total weight of the coating composition depending upon the desired properties in the cured compositions.

The preferred polyepoxides containing two or more epoxy groups per molecule which are suitable for reacting with the adducts of the present invention are any of the polyepoxides described hereinabove which are useful in preparing the adduct compositions per se. However, other reactive materials such as polyisocyanates and amino-formaldehydes selected from melamine formaldehydes, urea formaldehydes and benzoguanamine formaldehydes can also be reacted with the adducts of the present invention to give polyurethane coating compositions and amino-formaldehyde coating compositions respectively. The polyisocyanates and amino-formaldehydes are well known in the art and no further description is necessary to enable one skilled in the art to know what they are. The concentration of the polyepoxide or polyisocyanate or amino-formaldehydes in the curable high solids coating compositions can range from about 1 to about 95 weight percent, preferably from 25 to 90 weight percent and most preferably from 50 to 80 weight percent of the total weight of the coating composition depending upon the desired properties in the cured composition.

Suitable catalysts which can be employed in the curable high solids coating compositions to effect curing thereof preferably include any of the sulfonic acid catalysts or derivatives thereof described hereinabove which are useful in preparing the adduct compositions per se. The concentration of the catalyst in the curable high solids coating compositions can range from about 0.1 to 30 parts by weight per 100 parts by weight of the combination of the polyepoxide and the adduct composition.

For photocopolymerizable coating compositions, a photoinitiator can be employed in place of the above catalyst. The photoinitiator suitable for use in the curable coating compositions may be any one of the well known photoinitiators such as described in, for example, U.S. Pat. Nos. 4,231,951; 4,256,828; 4,138,255 and 4,058,401, which patents are incorporated herein by reference. Preferred photoinitiators alone or in admixture include triarylsulfonium complex salts as described in U.S. Pat. No. 4,231,951, aromatic sulfonium or iodonium salts of halogen-containing complex ions as described in U.S. Pat. No. 4,256,828; aromatic onium salts of Group VIa elements as described in U.S. Pat. Nos. 4,058,401 and 4,138,255; aromatic onium salts of Group Va elements as described in U.S. Pat. No. 4,069,055. Such salts are commercially available as FC-508 and FC-509 (available from Minnesota Mining and Manufacturing Company), and as UVE-1014 (available from General Electric Company). The photoinitiators are used in conventional amounts such as from about 0.1 to 30 parts by weight per 100 parts by weight of the combination of polyepoxide and the adduct composition.

The curable coating compositions may preferably include additives in conventional quantities such as oils, particularly silicone oil, surfactants such as silicone-alkylene oxide copolymers, e.g., L-5410 commercially available from Union Carbide Corporation, silicone oil containing aliphatic epoxide groups, fluorocarbon surfactants such as FC-171 commercially available from the 3M Company and FC-430 also commercially available from the 3M Company; low molecular weight alcohols such as ethanol, propanol, butanol, hexanol and the like; hydroxyl-containing copolymers of ethylenically unsaturated monomers such as RJ-100 commercially available from Monsanto Chemical Company; cellosolves, such as butyl CELLOSOLVE commercially available from Union Carbide Corporation; carbitols, such as butyl CARBITOL; diethyleneglycol; low molecular weight hydroxyl-containing vinyl polymers such as UCAR Solution Vinyl VYES commercially available from Union Carbide Corporation; glycidyl ether monomers of the formula:

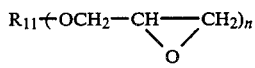

wherein $R_{11}$ is alkyl or aryl and n is an integer of 1 to 6. Examples are glycidyl ethers of polyhydric phenols obtained by reacting a polyhydric phenol with an excess of chlorohydrin such as epichlorohydrin. Further examples of this type are described in, for example, U.S. Pat. No. 3,018,262; alpha olefin epoxides; epoxy novolaks, and the like. If desired, one may also include in the coating compositions various conventional non-basic fillers (e.g., silica, talc, glass beads or bubbles, clays, powdered metal such as aluminum, zinc oxide, etc.) up to about 50% by volume or more, viscosity modifiers, rubbers, tackifying agents, pigments, and so forth. The particular additives or fillers selected are of no consequence to the basic invention.

In addition, the curable coating compositions can be combined with various structural fibers and cured to form useful high-strength composite materials. The structural fibers which are useful with the curable coating compositions include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. duPont de Nemours, Inc., Wilmington, Del.), and silicon carbide fibers.

The curable coating compositions may preferably include a substituted cycloaliphatic monoepoxide reactive diluent. The substituted cycloaliphatic monoepoxide used in the coating compositions is substituted with alkyl of 1 to 9 carbon atoms, halogen oxygen, ether, ester or vinyl radicals. Preferably, the substituted cycloaliphatic monoepoxide is vinyl substituted cycloaliphatic monoepoxide and is preferably selected from one or more of the following:

(1) 4-vinyl cyclohexene monoepoxide having the formula:

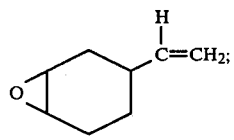

(2) norbornene monoepoxide having the formula:

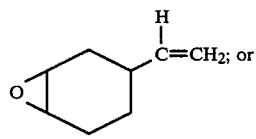

(3) limonene monoepoxide having the formula:

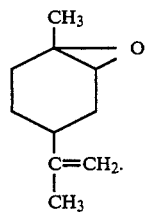

The substituted cycloaliphatic monoepoxide acts as a reactive diluent that cures into the final coating product, a marked effect in lowering viscosity, is not volatilized during the cure operation, does not retard the curing rate.

The substituted cycloaliphatic monoepoxide is used in the curable coating compositions in amounts of from about 0.1 to about 95, preferably from about 1 to about 60, and most preferably, from about 3 to about 30 weight percent.

In preparing the coating compositions, the ingredients are mixed by conventional procedures used in the production of inks, paints and coating compositions. These procedures are so well known to those skilled in the art that they do not require further discussion here. However, it should be noted that when a photoinitiator is incorporated into the coating compositions, it is necessary that the curable coating formulation be mixed or blended under "safe light" such as a yellow light source to obviate or minimize photocopolymerization. The coating compositions can also contain an organic solvent as an optional component. Any of the conventional solvents used in the coatings industry can be used at a concentration preferably below 30 weight percent of the total weight of the coating composition. Suitable solvents are acetone, methylene chloride and any solvent that does not react appreciably with the coating ingredients. While larger amounts of solvent could conceivably be used, the use of larger amounts would negate the benefits of high solids curable coatings which are considered to be essentially 100% solids coating systems. The solvents are generally added in the small amounts indicated to improve flowability during application of the coating composition to the substrate.

The curable coating compositions are applied as wet films to a suitable surface or substrate by conventional means such as roll coating or spray. Curing of the curable coating compositions can be effected by heating the wet films at a temperature of from about 100° C. to about 200° C. for a period of time of from about 1 minute to about 2 hours or longer. Curing can also be effected by photopolymerization of the coating compositions which occurs on exposure of the compositions to any source of radiation emitting actinic radiation at a wavelength within the ultraviolet and visible spectral regions. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiators being utilized and depending upon the radiation source and distance from the source and the thickness of the coating to be cured. The compositions may also be polymerized by exposure to electron beam irradiation. Generally speaking the dosage necessary is from less than 1 megarad to 100 megarad or more. Generally speaking the rate of polymerization increases with increasing amounts of photoinitiator at a given light exposure or irradiation. The rate of polymerization also increases with increasing light intensity or electron dosage.

The curing or photopolymerization of the coating compositions is a triggered reaction. Once the degradation of the photointiator to a cationic catalyst has begun by exposure to a radiation source, the curing or photopolymerization reaction proceeds and will continue after the radiation source is removed. The use of thermal energy during or after exposure to a radiation source, i.e., post cure thermally, will generally accelerate the curing reaction, and even a moderate increase in temperature may greatly accelerate cure rate.

The cured coating compositions can be useful as automotive finishes, can finishes, appliance finishes, business machine finishes, coil coating, house siding finishes, general metal finishes and the like. The compositions can also be used as adhesives, printing inks, casting and molding compounds, potting and encapsulating compounds, caulking and sealing compounds, impregnating and coating compounds and the like. The photocopolymerizable compositions are particularly suitable in a variety of applications in the fields of protective coatings and graphic arts due to their excellent impact resistance and abrasion-resistance and adhesion to rigid, resilient and flexible substrates such as metal, plastic, rubber, glass, paper, wood, and ceramics.

The low viscosity adducts prepared in the examples below were evaluated according to the following procedures:

Oxirane Content: Tetraethylammonium bromide reagent was prepared by dissolving 350 grams of 99 percent tetraethylammonium bromide in a mixture of 1400 milliliters of c.p. acetic acid and 1800 milliliters of reagent grade chlorobenzene and then adding 1.0 milliliter of 1 percent crystal violet indicator in acetic acid. The reagent was mixed well and neutralized to a blue-green color. Anhydrous standard 0.1 N perchloric acid in acetic acid was prepared by dissolving 30 milliliters of 70-72 percent perchloric acid in approximately 2000 milliliters of c.p. acetic acid, and then adding 100 milliliters of acetic anhydride and diluting to 3500 milliliters with c.p. acetic acid. Standardization was against 0.7-0.8 grams of potassium acid phthalate dissolved in 50 milliliters of acetic acid using crystal violet indicator. Using a graduated cylinder, 100 milliliters of the tetraethylammonium bromide reagent was added to each of two 250 milliliter wide-mouth Erlenmeyer flasks. About 0.7 to 0.8 grams of the adduct product, weight to the nearest milligram, were added to each flask and mixed well. The contents in the flasks were titrated immediately with the anhydrous standard 0.1 N perchloric acid in acetic acid to a blue-green color end point stable for 2 minutes and the percent oxirane was calculated as follows:

$$\frac{(A)(N)(1.6)}{\text{grams sample}} = \text{percent by weight oxirane}$$

where A is the milliliters of anhydrous standard perchloric acid in acetic acid titration solution and N is the normality of the anhydrous standard perchloric acid in acetic acid.

Viscosity (centistokes): determined at the specified temperature by means of a calibrated capillary-type viscometer having the required centistoke range.

Viscosity (centipoise): determined with a Brookfield viscometer at ambient temperature.

Hydroxyl Number: Phthalic anhydride-imidazole-pyridine reagent was prepared by weighing 111-116 grams of c.p. phthalic anhydride into a one-quart brown bottle and then adding 700 milliliters of pyridine which had been distilled over phthalic anhydride. The contents in the bottle were mixed vigorously to effect complete solution and 16-18 grams of c.p. imidazole were added and swirled carefully to dissolve. Into heat-resistant pressure bottles was pipeted 25 milliliters of the phthalic anhydride-imidazole-pyridine reagent and, by means of a hypodermic syringe or other suitable equipment, a calculated amount of adduct product, weighed to the nearest 0.1 milligram, was added to some of the bottles (some bottles reserved for blank determination). The bottles were capped and swirled until the sample was completely dissolved in the reagent. Each bottle was then placed in a water bath maintained at 98° C.±2° C. for 30 minutes, and thereafter allowed to cool to ambient temperature. To each bottle was added 50 milliliters of redistilled pyridine and, after 2 minutes, approximately 0.5 milliliters of a 1.0 percent solution of phenolphthalein in pyridine. The contents in the bottles were titrated with standard 0.5 N sodium hydroxide to a pink color end point stable for at least 15 seconds and the hydroxyl number was calculated as follows:

$$\frac{(B - A)(N)(56.1)}{\text{grams sample}} = \text{Hydroxyl No. (mg KOH/gram sample)}$$

where A is the milliliters of standard sodium hydroxide titration solution required for the sample, B is the milliliters of standard sodium hydroxide titration solution required for the blank sample, and N is the normality of the sodium hydroxide.

Acid Number: A solution was prepared containing 1200 milliliters of isopropanol, 200 milliliters of water and 150 milliliters of methylene chloride. Into a 250 milliliter Erlenmeyer flask was added 50 milliliters of the above solution and a 10 gram sample of adduct product, weighed to the nearest 0.1 milligram. The contents were swirled to effect complete solution, and 1.0-1.5 milliliters of a 1.0 percent solution of phenolphthalein in methanol was added and swirled into solution. The contents in the flask were titrated with 0.02 N potassium hydroxide in alcohol to a pink color end point for small acid number values and with 0.1 N potassium hydroxide in alcohol for high acid number values. The acid number was calculated as follows:

$$\frac{(A)(N)(56.1)}{\text{grams sample}} = \text{Acid No. (mg. KOH/gram sample)}$$

where A is the milliliters of potassium hydroxide titration solution required for the sample and N is the normality of the potassium hydroxide in alcohol.

Water Content: a determination of any concentration of water in the adduct product by titration with a sulfur dioxide-iodine reagent as more fully described in Union Carbide Corporation Laboratory Manual Specification Method 31-29W1-4 (Mar. 2, 1955).

Color, Gardner Scale: a measurement of the color of transparent liquid adduct product solutions as described in ASTM D 1544-68 (Reapproved 1974).

The coating compositions prepared in the examples below were evaluated according to the following procedures:

Solvent Resistance (Double Acetone Rubs): a measure of the resistance of the cured film to attack by acetone in which a film coating surface was rubbed with an acetone soaked cheesecloth back and forth with hand pressure. A rub back and forth with hand pressure over the film coating surface with the acetone soaked cheesecloth was designated as one "double acetone rub". The effect that a certain number of double acetone rubs had on the film coating surface was reported by a number in parenthesis following the number of double acetone rubs. The rating system for evaluating acetone resistance for a given number of double acetone rubs was as follows:

Number in Parenthesis After Number of Rubs (1) No change in coating appearance.
(2) Scratched surface.
(3) Dulled, marred, some coating removed.
(4) Breaks in coating appearance.
(5) About one-half of the coating removed.

Pencil Hardness: pencil leads of increasing hardness values were forced against the film coating surface in a precisely defined manner as described in ASTM-D-3363-74 until one pencil lead marred the surface of the film coating. The surface hardness was considered as the hardest pencil grade which just failed to mar the film coating surface. The pencil leads in order of softest to hardest were reported as follows: 6B, 5B, 4B, 3B, 2B, B, HB, F, H, 2H, 3H, 4H, 5H, 6H, 7H, 8H, and 9H.

Crosshatch Adhesion: a lattice pattern with ten cuts in each direction was made in the coating film to the substrate and pressure-sensitive adhesive tape was applied over the lattice pattern and then removed. The adhesion was evaluated by comparison with descriptions and illustrations as more fully detailed in ASTM-D-3359-78.

Forward Impact Resistance (Gardner Impact): a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the coated side of the coated steel panel. The inches times pounds, designated inch-pounds, absorbed by the film without rupturing was recorded as the films forward impact resistance.

Reverse Impact Resistance (Gardner Impact): a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the films reverse impact resistance.

Water Immersion Resistance: the cured film coating was immersed in water for a specified period of time and at a specified temperature. After removal from the water, the hydrolytic resistance of the cured film coating was determined by the pencil hardness test and the crosshatch adhesion test described hereinabove. Results obtained were compared with the results of identical tests performed on cured film coatings not immersed in water to determine moisture resistance.

The following examples are illustrative of the present invention and are not intended as a limitation upon the scope thereof. As used in the examples appearing hereinafter, the following designation, terms and abbreviations have the indicated meanings:

| | |
|---|---|
| mg. | milligram |
| °C. | Centigrade degree |
| °F. | Fahrenheit degree |
| cc | cubic centimeter |
| Epoxide I | 3,4-Epoxycyclohexylmethyl-3,4-epoxycyclohexane carboxylate commercially available from Union Carbide Corporation as ERL-4221. |
| Epoxide II | Vinylcyclohexene diepoxide commercially available from Union Carbide Corporation as ERL-4206. |
| Epoxide III | A digylcidyl ether of Bisphenol A having an equivalent weight of 185–192 and commercially available from Shell Chemical Company as EPON 828. |
| Epoxide IV | 4-Vinylcyclohexene monoepoxide. |
| Melamine I | A modified melamine resin in 20 weight percent isobutanol and commercially available from American Cyanamid Company as Cymel 325. |
| Polyol I | A trihydroxyfunctional propylene oxide polyol having an average equivalent weight of 501, an average hydroxyl number of 112, and commercially available from Union Carbide Corporation as NIAX Polyol LHT-112. |
| Polyol II | A dihydroxyfunctional propylene oxide polyol having an average equivalent weight of 1000, an average hydroxyl number of 56.1 commercially available from Union Carbide Corporation as NIAX Polyol PPG-2025. |
| Polyol III | Tripropylene glycol. |
| Polyol IV | A dihydroxyfunctional polytetramethylene oxide polyol having an average molecular weight of 650, an average hydroxyl number of 160–187 and commercially available from the Quaker Oats Company as Polymeg 650. |
| Polyol V | A dihydroxyfunctional polytetramethylene oxide polyol having an average molecular weight of 1000, an average hydroxyl number of 107–118 and commercially available from the Quaker Oats Company as Polymeg 1000. |
| Polyol VI | A dihydroxyfunctional polytetramethylene oxide polyol having an average molecular weight of 2000, an average |

|  |  |
|---|---|
|  | hydroxyl number of 53-59 and commercially available from the Quaker Oats Company as Polymeg 2000. |
| Polyol VII | A dihydroxyfunctional polyol prepared by reacting 63 mole percent caprolactone, 19 mole percent diethylene glycol and 18 mole percent adipic acid at an elevated temperature; having an average molecular weight of 3,066, an average hydroxyl number of 36.6 and commercially available from Union Carbide Corporation as D-737. |
| Polyol VIII | A polycaprolactone triol having an average molecular weight of 540, an average hydroxyl number of 310 and commercially available from Union Carbide Corporation as TONE-0305. |
| Polyol IX | A polycaprolactone triol having an average molecular weight of 300, an average hydroxyl number of 560, and commercially available from Union Carbide Corporation as TONE-0301. |
| Polyol X | A difunctional polyol believed to be a butanediol adipate polyol having a hydroxyl number of 103-117, a nominal molecular weight of 1000 and commercially available from Ruco Polymer Corporation as Rucoflex S-102-110. |
| Polyol XI | A difunctional polyol believed to be a butanediol adipate polyol having a hydroxyl number of 51-59, a nominal molecular weight of 2000 and commercially available from Ruco Polymer Corporation as Rucoflex S-102-55. |
| Catalyst I | An aqueous solution of 60 weight percent diethylammonium triflate and 40 weight percent of a 50/50 mixture of water and butyl CARBITOL and commercially available from the 3M Company as FC-520. |
| Catalyst II | A catalyst material in 60 weight percent isopropanol having an acid number of 130-140 and a specific gravity of 0.960 and commercially available from American Cyanamid Company as Cycat 4040. |
| Catalyst III | Stannous Octoate. |
| Photoinitiator I | A solution of a triarylsulfonium hexafluorophosphate having a specific gravity of 1.33 at 23° C., and Brookfield viscosity of 40,000-60,000 centipoise (#4 spindle at 6 rpm, 23° C.) and commercially available from the 3M Company as FC-508. |
| Surfactant I | A silicone composition having the following structure: |

$$(CH_3)_3SiO-\left[\begin{array}{c}CH_3\\|\\SiO\\|\\CH_3\end{array}\right]_{13}-\left[\begin{array}{c}CH_3\\|\\SiO\\|\\(CH_2)_3-(OC_2H_4)_7OH\end{array}\right]_{5.5}-Si(CH_3)_3$$

|  |  |
|---|---|
|  | and commercially available from Union Carbide Corporation as L-5410. |
| Solvent I | Methyl isobutyl ketone. |
| Polyol Adduct I | The product prepared in Example 1 containing tetrafunctional polyol adduct and having the properties described in Example 1. |
| Polyol Adduct II | The product prepared in Example 2 containing tetrafunctional polyol adduct and having the properties described in Example 2. |
| Polyol Adduct III | The product prepared in Example 6 containing hexafunctional polyol adduct and having the properties described in Example 6. |

COMPARATIVE EXAMPLE A

Into a 100 gallon glass-lined autoclave (G101) previously cleaned with refluxing acetone and dried with nitrogen was added 617.4 pounds of Polyol IX and 282.6 pounds of Epoxide I (a 2/1 mole ratio). The contents in the autoclave were mixed for 15 minutes at ambient temperature, after which 61 gram of Catalyst III were added to the autoclave and the autoclave contents were then mixed for 1 hour at ambient temperature. Mixing was accomplished by alternate two-blade and three-blade Glascote impellers, a total of four sets on a single off-center shaft operated at 114 rpm. The contents in the autoclave were then heated to a temperature of 170° C. with continuous mixing and maintained at this temperature for 27 hours. The reaction temperature was controlled by circulating tempered ethylene glycol through the autoclave jacket and high-purity nitrogen was used to exclude air and/or moisture from the autoclave. Samples were taken at intervals and analyzed for percent oxirane content and viscosity. After 3 hours into the total 27 hour heating period, the oxirane content was measured as 2.07 percent and the viscosity at 54.5° C. was 14,097 centistokes. After 5 hours into the total 27 hour heating period, the oxirane content was measured as 1.47 percent and the viscosity at 54.5° C. was 16,735 centistokes. After 7 hours into the total 27 hour heating period, the oxirane content was measured as 1.16 percent and the viscosity at 54.5° C. was 18,340 centistokes. After 10 hours into the total 27 hour heating period, the oxirane content was measured as 0.93 percent and the viscosity at 54.5° C. was 19,956 centistokes. After 14.5 hours into the total 27 hour heating period, the oxirane content was measured as 0.73 percent and the viscosity at 54.5° C. was 20,792 centistokes. At the end of the 27 hour heating period, the oxirane content was measured as 0.51 percent and the viscosity at 54.5° C. was 21,850 centistokes. After cooling to a temperature of 80° C., the contents in the autoclave were then collected as a residue product and, upon analysis, the residue product was found to have the following properties:

| | |
|---|---|
| Oxirane Content | 0.51 percent |
| Viscosity at 54.5° C. | 21,850 centistokes |
| Hydroxyl No. | 399 mg. KOH/gram |
| Color, Gardner Scale | −1 |

Comparative Example A illustrates the high viscosity product that is obtained when the art described in U.S. Pat. No. 3,896,303 is practiced.

COMPARATIVE EXAMPLE B

Into a 2 liter four-necked round bottom reaction flask equipped with a nitrogen inlet and outlet port, mechanical stirrer, heating mantle and thermometer was added 450 grams (1.5 moles) of Polyol IX, 540 grams (1.0 mole) of Polyol VIII, and 274 grams (1.0 mole) of Epoxide I (a mole ratio of 1.5:1:1 respectively). The contents in the reaction flask were heated to a temperature of 100° C. with continuous stirring after which 0.19 grams (0.015 weight percent based on total charge) of Catalyst III were added to the reaction flask. The contents in the reaction flask were then heated to a temperature of 150° C. with continuous stirring and maintained at this temperature for 6.5 hours. A nitrogen blanket was maintained throughout this reaction period. Samples were taken at intervals and analyzed for percent oxirane content. After 2 hours into the total 6.5 hour heating period, the oxirane content was measured as 1.94 percent. After 3 hours into the total 6.5 hour heating period, the oxirane content was measured as 0.63 percent. After 5 hours into the total 6.5 hour heating period, the oxirane content was measured as 0.18 percent. At the end of the 6.5 hour heating period, the oxirane content was measured as 0.106 percent. After cooling to a temperature of 50° C., the contents in the reaction flask were then collected as a residue product (yellow liquid) and, upon analysis, the residue product was found to have the following properties:

| | |
|---|---|
| Oxirane Content | 0.106 percent |
| Viscosity at 54.5° C. | 3790 centistokes |
| Hydroxyl No. | 333 mg. KOH/gram |
| Color, Gardner Scale | ~3.5 |

Comparative Example B illustrates the product that is obtained when the art described in U.S. Pat. No. 4,045,474 is practiced (see Example 2 therein).

COMPARATIVE EXAMPLE C

Into a 100 gallon glass-lined autoclave (G101) previously cleaned with refluxing acetone and dried with nitrogen was added 320 pounds of Polyol IX, 385 pounds of Polyol VIII and 195 pounds of Epoxide I (a mole ratio of 1.5:1:1 respectively). The contents in the autoclave were heated to a temperature of 110° C. with continuous mixing, after which 61.3 grams of Catalyst III were added to the autoclave. Mixing was accomplished by a 15 inch three-blade Glascote impeller operated at 114 rpm. The contents in the autoclave were then heated to a temperature of 150° C. with continuous mixing and maintained at this temperature for 22.5 hours. The reaction temperature was controlled by circulating tempered ethylene glycol through the autoclave jacket and a slight air purge was maintained throughout the reaction. After 7.25 hours into the total 22.5 hour heating period, an additional 61.3 grams of Catalyst III were added to the autoclave. The oxirane content was monitored during the remaining reaction period (15.25 hours) to ascertain the decrease in epoxide content and the extent of the reaction. At the end of the 22.5 hour heating period, the oxirane content was measured as 0.30 percent. After cooling to a temperature of 80° C., the contents in the autoclave were then collected as a filtered product and, upon analysis, the filtered product was found to have the following properties:

| | |
|---|---|
| Oxirane Content | 0.30 percent |
| Viscosity at 54.5° C. | 3250 centipoise |
| Hydroxyl No. | 345 mg. KOH/gram |
| Color, Gardner Scale | 2.5 |
| Water Content | 0.02 percent |

Comparative Example C illustrates the product that is obtained when the art described in U.S. Pat. No. 4,045,474 is practiced. A long reaction time is required to attain a low final oxirane content.

COMPARATIVE EXAMPLE D

Into a 2 liter four-necked round bottom reaction flask equipped with a nitrogen inlet and outlet port, mechanical stirrer, heating mantle and thermometer was added 450 grams (1.5 moles) of Polyol IX, 540 grams (1.0 mole) of Polyol VIII, and 274 grams (1.0 mole of Epoxide I (a mole ratio of 1.5:1:1 respectively). The contents in the reaction flask were heated to a temperature of 100° C. with continuous stirring after which 0.19 grams (0.015 weight percent based on total charge) of Catalyst III were added to the reaction flask. The contents in the reaction flask were then heated to a temperature of 150° C. with continuous stirring and maintained at this temperature for 13 hours. A nitrogen blanket was maintained throughout this reaction period. Samples were taken at intervals and analyzed for percent oxirane content. After 7 hours into the total 13 hour heating period, the oxirane content was measured as 1.36 percent. After 10 hours into the total 13 hour heating period, the oxirane content was measured as 0.30 percent. After 12 hours into the total 13 hour heating period, the oxirane content was measured as 0.16 percent. At the end of the 13 hour heating period, the oxirane content was measured as 0.12 percent. After cooling to a temperature of 50° C., the contents in the reaction flask were then collected as a residue product and, upon analysis, the residue product was found to have the following properties:

| | |
|---|---|
| Oxirane Content | 0.12 percent |
| Viscosity at 54.5° C. | 3713 centistokes |
| Hydroxyl No. | 338 mg. KOH/gram |

Comparative Example D illustrates the product that is obtained when the art described in U.S. Pat. 4,045,474 is practiced (see Example 2 therein).

COMPARATIVE EXAMPLE E

Into a 5 liter four-necked round bottom reaction flask equipped with a nitrogen inlet and outlet port, mechanical stirrer, heating mantle and thermometer was added 2444 grams (8.15 moles) of Polyol IX and 744 grams (2.72 moles) of Epoxide I (a mole ratio of 3:1). The contents in the reaction flask were heated to a temperature of 100° C. with continuous stirring after which 0.239 grams (0.0075 weight percent based on total charge) of Catalyst III were added to the reaction flask. The contents in the reaction flask were then heated to a temperature of 150° C. with continuous stirring and maintained at this temperature for 148.75 hours. A nitrogen blanket was maintained throughout this reaction period. When the temperature reached 150° C., an additional 0.239 grams (0.0075 weight percent based on total charge) of Catalyst III were added to the reaction flask. Samples were taken at intervals and analyzed for percent oxirane content and viscosity. After 21.5 hours into the total 148.75 hour heating period, the oxirane content was measured as 1.97 percent and the viscosity at 54.5° C. was 792 centistokes. After 38.75 hours into the total 148.75 hour heating period, the oxirane content was measured as 1.29 percent and the viscosity at 54.5° C. was 1652 centistokes. After 46.25 hours into the total 148.75 hour heating period, the oxirane content was measured as 1.18 percent and the viscosity at 54.5° C. was 2667 centistokes. After 90.25 hours into the total 148.75 hour heating period, the oxirane content was measured as 0.58 percent and the viscosity at 54.5° C. was 9560 centistokes. After 136.25 hours into the total 148.75 hour heating period, the oxirane content was measured as 0.12 percent and the viscosity at 54.5° C. was 26,176 centistokes. At the end of the 148.75 hour heating period, the oxirane content was measured as 0.06 percent and the viscosity at 54.5° C. was 31,848 centistokes. After cooling to a temperature of 50° C., the contents in the reaction flask were then collected as a residue product and, upon analysis, the residue product was found to have the following properties:

| Oxirane Content | 0.06 percent |
|---|---|
| Viscosity at 54.5° C. | 31,848 centistokes |
| Hydroxyl No. | 314 mg. KOH/gram |
| Color, Gardner Scale | 5.0 |

Comparative Example E illustrates the product that is obtained when the comparative art described in U.S. Pat. No. 4,045,474 is practiced (see Control 3 therein).

EXAMPLE 1

Into a 2 liter four-necked round bottom reaction flask equipped with a nitrogen inlet and outlet port, mechanical stirrer, heating mantle and thermometer was added 780 grams (1.25 moles) of Polyol IV. The polyol was heated to a temperature of 140° C. with continuous stirring and sparging with nitrogen, after which 137 grams (0.5 moles) of Epoxide I and 0.32 grams (0.035 weight percent based on total charge) of Catalyst I were added to the reaction flask. The contents in the reaction flask were maintained at a temperature of 140°-145° C. for a period of 2 hours with continuous stirring. A nitrogen blanket was maintained throughout this reaction period (nitrogen sparge removed). Samples were taken at intervals and analyzed for percent oxirane content. At the end of the 2 hour heating period, the oxirane content was measured as 0.00 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

| Oxirane Content | 0.00 percent |
|---|---|
| Viscosity at 54.5° C. | 411 centistokes |
| Hydroxyl No. | 154.8 mg. KOH/gram |
| Acid No. | 0.26 mg. KOH/gram |
| Water Content | 0.00 percent |

EXAMPLE 2

Into a 2 liter four-necked round bottom reaction flask equipped with a nitrogen inlet and outlet port, mechanical stirrer, heating mantle and thermometer was added 2416 grams (2.50 moles) of Polyol V. The polyol was heated to a temperature of 140° C. with continuous stirring and sparging with nitrogen, after which 274 grams (1.0 mole) of Epoxide I and 0.63 grams (0.023 weight percent based on total charge) of Catalyst I were added to the reaction flask. The contents in the reaction flask were maintained at a temperature of 140°-145° C. for a period of 3.5 hours with continuous stirring. A nitrogen blanket was maintained throughout this reaction period (nitrogen sparge removed). Samples were taken at intervals and analyzed for percent oxirane content. At the end of the 3.5 hour heating period, the oxirane content was measured as 0.03 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

| Oxirane Content | 0.03 percent |
|---|---|
| Viscosity at 54.5° C. | 537 centistokes |
| Hydroxyl No. | 114.6 mg. KOH/gram |
| Acid No. | 0.26 mg. KOH/gram |
| Water Content | 0.00 percent |

EXAMPLE 3

Into a 2 liter four-necked round bottom reaction flask equipped with a nitrogen inlet and outlet port, mechanical stirrer, heating mantle and thermometer was added 2460 grams (1.25 moles) of Polyol VI. The polyol was heated to a temperature of 140° C. with continuous stirring and sparging with nitrogen, after which 137 grams (0.5 moles) of Epoxide I and 0.32 grams (0.012 weight percent based on total charge) of Catalyst I were added to the reaction flask. The contents in the reaction flask were maintained at a temperature of 140°-145° C. for a period of 4.75 hours with continuous stirring. A nitrogen blanket was maintained throughout this reaction period (nitrogen sparge removed). Samples were taken at intervals and analyzed for percent oxirane content. At the end of the 4.75 hour heating period, the oxirane content was measured as 0.00 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

| Oxirane Content | 0.00 percent |
|---|---|
| Viscosity at 54.5° C. | 1468 centistokes |
| Hydroxyl No. | 65.6 mg. KOH/gram |
| Acid No. | 0.31 mg. KOH/gram |
| Water Content | 0.10 percent |

EXAMPLE 4

Into a 2 liter four-necked round bottom reaction flask equipped with a nitrogen inlet and outlet port, mechanical stirrer, heating mantle and thermometer was added 225 grams (0.113 moles) of Polyol II. The polyol was heated to a temperature of 100° C. with continuous stirring and sparging with nitrogen, after which 0.10 grams (0.043 weight percent based on total charge) of Catalyst I were added to the reaction flask. The contents in the reaction flask were then heated to a temperature of 110° C., after which 8.75 grams (0.063 moles) of Epoxide II were added into the reaction flask. The contents in the reaction flask were maintained at a temperature of 165° C. for a period of one hour with continuous stirring. A nitrogen blanket was maintained throughout this reaction period (nitrogen sparge removed). Samples were taken at intervals and analyzed for percent oxirane content. At the end of the one hour heating period, the oxirane content was measured as 0.00 percent and the reaction was considered complete. After cooling to ambient temperature, the contents in the reaction flask were then collected as a residue product and, upon analysis, the residue product containing principally on the average a tetrafunctional polyol adduct was found to have the following properties.

| | |
|---|---|
| Oxirane Content | 0.00 percent |
| Viscosity at 54.5° C. | 117 centistokes |
| Viscosity at 30.0° C. | 390 centistokes |
| Hydroxyl No. | 54.67 mg. KOH/gram |
| Acid No. | 0.13 mg. KOH/gram |
| Water Content | 0.00 percent |

EXAMPLE 5

Into a 2 liter four-necked round bottom reaction flask equipped with a nitrogen inlet and outlet port, mechanical stirrer, heating mantle and thermometer was added 250 grams (0.125 moles) of Polyol II. The polyol was heated to a temperature of 100° C. with continuous stirring and sparging with nitrogen, after which 0.0129 grams (0.005 weight percent based on total charge) of Catalyst I were added to the reaction flask. The contents in the reaction flask were then heated to a temperature of 110° C., after which 8.75 grams (0.063 moles) of Epoxide II were added into the reaction flask. The contents in the reaction flask were maintained at a temperature of 165° C. for a period of 1.5 hours with continuous stirring. A nitrogen blanket was maintained throughout this reaction period (nitrogen sparge removed). Samples were taken at intervals and analyzed for percent oxirane content. At the end of the 1.5 hour heating period, the oxirane content was measured as 0.00 percent and the reaction was considered complete. After cooling to ambient temperature, the contents in the reaction flask were then collected as a residue product and, upon analysis, the residue product containing principally on the average a tetrafunctional polyol adduct was found to have the following properties.

| | |
|---|---|
| Oxirane Content | 0.00 percent |
| Viscosity at 23.8° C. | 510 centistokes |
| Hydroxyl No. | 58.5 mg. KOH/gram |
| Acid No. | 0.14 mg. KOH/gram |
| Water Content | 0.00 percent |

EXAMPLE 6

Into a 2 liter four-necked round bottom reaction flask equipped with a nitrogen inlet and outlet port, mechanical stirrer, heating mantle and thermometer was added 375 grams (0.25 moles) of Polyol I. The polyol was heated to a temperature of 100° C. with continuous stirring and sparging with nitrogen, after which 0.125 grams (0.032 weight percent based on total charge) of Catalyst I were added to the reaction flask. The contents in the reaction flask were then heated to a temperature of 110° C., after which 17.50 grams (0.125 moles) of Epoxide II were added into the reaction flask. The contents in the reaction flask were maintained at a temperature of 165° C. for a period of 0.65 hours with continuous stirring. A nitrogen blanket was maintained throughout this reaction period (nitrogen sparge removed). Samples were taken at intervals and analyzed for percent oxirane content. At the end of the 0.65 hour heating period, the oxirane content was measured as 0.00 percent and the reaction was considered complete. After cooling to ambient temperature, the contents in the reaction flask were then collected as a residue product and, upon analysis, the residue product containing principally on the average a hexafunctional polyol adduct was found to have the following properties.

| | |
|---|---|
| Oxirane Content | 0.00 percent |
| Viscosity at 54.5° C. | 105 centistokes |
| Viscosity at 30.0° C. | 402 centistokes |
| Hydroxyl No. | 112.96 mg. KOH/gram |
| Acid No. | 0.11 mg. KOH/gram |
| Water Content | 0.00 percent |

EXAMPLE 7

Into a 2 liter four-necked round bottom reaction flask equipped with a nitrogen inlet and outlet port, mechanical stirrer, heating mantle and thermometer was added 24.0 grams (0.125 moles) of Polyol III and 187.7 grams (0.125 moles) of Polyol I. The polyols were heated to a temperature of 110° C.–120° C. with continuous stirring, after which 27.4 grams (0.10 moles) of Epoxide I and 0.179 grams (0.075 weight percent based on total charge) of Catalyst I were added to the reaction flask. The contents in the reaction flask were then heated to a temperature of 170° C. for a period of 0.25 hours with continuous stirring. A nitrogen blanket was maintained throughout the reaction period. When the temperature reached about 160° C., an exotherm of 30° C. to 40° C. was noticed, after which the temperature decreased to 170° C. At the end of the 0.25 hour heating period, the oxirane content was measured as 0.00 percent and the reaction was terminated. After cooling to ambient temperature, the contents in the reaction flask were then collected as a residue product and, upon analysis, the residue product containing principally on the average a mixture of a hexafunctional polyol adduct, pentafunctional polyol adduct, tetrafunctional polyol adduct and unreacted trifunctional polyol and difunctional polyol was found to have the following properties:

| | |
|---|---|
| Oxirane Content | 0.00 percent |
| Viscosity at 54.5° C. | 188 centistokes |
| Hydroxyl No. | 157 mg. KOH/gram |
| Acid No. | 0.57 mg. KOH/gram |

EXAMPLE 8

Into a 2 liter four-necked round bottom reaction flask equipped with a nitrogen inlet and outlet port, mechanical stirrer, heating mantle and thermometer was added 48.0 grams (0.25 moles) of Polyol III and 156.0 grams (0.25 moles) of Polyol IV. The polyols were heated to a temperature of 110° C.–120° C. with continuous stirring, after which 54.8 grams (0.20 moles) of Epoxide I and 0.194 grams (0.075 weight percent based on total charge) of Catalyst I were added to the reaction flask. The contents in the reaction flask were then heated to a temperature of 170° C. for a period of 1.0 hours with continuous stirring. A nitrogen blanket was maintained throughout the reaction period. When the temperature reached about 140° C.–150° C., an exotherm of 10° C. to 20° C. was noticed. Samples were taken at intervals and analyzed for percent oxirane content. At the end of the 1.0 hour heating period, the oxirane content was measured as 0.00 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

| Oxirane Content | 0.00 percent |
| --- | --- |
| Viscosity at 54.5° C. | 2178 centistokes |
| Hydroxyl No. | 240 mg. KOH/gram |
| Acid No. | 1.14 mg. KOH/gram |

EXAMPLE 9

Into a 2 liter four-necked round bottom reaction flask equipped with a nitrogen inlet and outlet port, mechanical stirrer, heating mantle and thermometer was added 766.4 grams (0.25 moles) of Polyol VII. The polyol was heated to a temperature of 110° C.-120° C. with continuous stirring, after which 27.4 grams (0.10 moles) of Epoxide I and 0.40 grams (0.05 weight percent based on total charge) of Catalyst I were added to the reaction flask. The contents in the reaction flask were then heated to a temperature of 170° C. for a period of 0.5 hours with continuous stirring. A nitrogen blanket was maintained throughout the reaction period. When the temperature reached about 140° C.-150° C., an exotherm of 10° C. to 20° C. was noticed. Samples were taken at intervals and analyzed for percent oxirane content. At the end of the 0.5 hour heating period, the oxirane content was measured as 0.00 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

| Oxirane Content | 0.00 percent |
| --- | --- |
| Viscosity at 54.5° C. | 4306 centistokes |
| Hydroxyl No. | 39.2 mg. KOH/gram |
| Acid No. | 0.72 mg. KOH/gram |

EXAMPLE 10

Into a 500 milliliter four-necked round bottom reaction flask equipped with a nitrogen inlet and outlet port, mechanical stirrer, heating mantle and thermometer was added 200 grams (0.20 moles) of Polyol X. The polyol was heated to a temperature of 140° C. with continuous stirring and sparging with nitrogen, after which 13.7 grams (0.05 moles) of Epoxide I and 0.15 grams (0.070 weight percent based on total charge) of Catalyst I were added to the reaction flask. The contents in the reaction flask were maintained at a temperature of 165° C.-170° C. for a period of one hour with continuous stirring. During this reaction period, the system exothermed to a temperature of 178° C. A nitrogen blanket was maintained throughout this reaction period (nitrogen sparge removed). At the end of the one hour heating period, the oxirane content was measured as 0.00 percent and the reaction was terminated. After cooling to ambient temperature, the contents in the reaction flask were then collected as a residue product and, upon analysis, the residue product containing principally on the average a mixture of a tetrafunctional polyol adduct and unreacted difunctional polyol was found to have the following properties:

| Oxirane Content | 0.00 percent |
| --- | --- |
| Viscosity at 54.5° C. | 718 centistokes |
| Hydroxyl No. | 104.8 mg. KOH/gram |
| Acid No. | 1.03 mg. KOH/gram |

EXAMPLE 11

Into a 500 milliliter four-necked round bottom reaction flask equipped with a nitrogen inlet and outlet port, mechanical stirrer, heating mantle and thermometer was added 200 grams (0.10 moles) of Polyol XI. The polyol was heated to a temperature of 140° C. with continuous stirring and sparging with nitrogen, after which 10.96 grams (0.04 moles) of Epoxide I and 0.15 grams (0.071 weight percent based on total charge) of Catalyst I were added to the reaction flask. The contents in the reaction flask were maintained at a temperature of 160° C.-170° C. for a period of 40 minutes with continuous stirring. A nitrogen blanket was maintained throughout the reaction period (nitrogen sparge removed). At the end of the 40 minute heating period, the oxirane content was measured as 0.00 percent and the reaction was terminated. After cooling to ambient temperature, the contents in the reaction flask were then collected as a residue product and, upon analysis, the residue product containing principally on the average a mixture of a tetrafunctional polyol adduct and unreacted disfunctional polyol was found to have the following properties:

| Oxirane Content | 0.00 percent |
| --- | --- |
| Viscosity at 54.5° C. | 2851 centistokes |
| Hydroxyl No. | 53.0 mg. KOH/gram |
| Acid No. | 1.03 mg. KOH/gram |

EXAMPLE 12

Into a 500 milliliter four-necked round bottom reaction flask equipped with a nitrogen inlet and outlet port, mechanical stirrer, heating mantle and thermometer was added 200 grams (0.20 moles) of Polyol X. The polyol was heated to a temperature of 110° C. with continuous stirring, after which 21.92 grams (0.08 moles) of Epoxide I and 0.15 grams (0.068 weight percent based on total charge) of Catalyst I were added to the reaction flask. The contents in the reaction flask were then heated to a temperature of 165° C.-187° C. for a period of 30 minutes with continuous stirring. A nitrogen blanket was maintained throughout the reaction period. At the end of the 30 minute heating period, the oxirane content was measured as 0.00 percent and the reaction was terminated. After cooling to ambient temperature, the contents in the reaction flask were then collected as a residue product and, upon analysis, the residue product containing principally on the average a mixture of tetrafunctional polyol adduct and unreacted difunctional polyol was found to have the following properties:

| | |
|---|---|
| Oxirane Content | 0.00 percent |
| Viscosity at 54.5° C. | 1290 centistokes |
| Hydroxyl No. | 92.4 mg. KOH/gram |
| Acid No. | 1.31 mg. KOH/gram |

EXAMPLES 13 THROUGH 18

Into glass bottles was added various specified combinations of Epoxide I, Epoxide III, Polyol Adduct I, Polyol Adduct II, Catalyst I and Surfactant I in the amounts specified for each example in Table I below. The contents in the bottles were thoroughly blended until homogeneous by simple stirring at a temperature of 40° C.-50° C.

TABLE I

| Example | 13 | 14 | 15 |
|---|---|---|---|
| Ingredients, grams | | | |
| Epoxide I | 18.75 | 18.75 | 16.25 |
| Epoxide III | — | — | 2.50 |
| Polyol Adduct I | 6.25 | — | — |
| Polyol Adduct II | — | 6.25 | 6.25 |
| Catalyst I | 0.25 | 0.25 | 0.25 |
| Surfactant I | 0.13 | 0.13 | 0.13 |

The blended formulations were then applied to Bonderite 37 ® treated steel panels using a Number 20 wire-wound rod and cured in a forced-air oven at 121.1° C. for 20 minutes. One Bonderite 37 ® treated steel panel coated with the specified blended formulation was prepared for each example. The cured coatings on the Bonderite 37 ® treated steel panels of Examples 16, 17 and 18 were prepared from the blended formulations of Examples 13, 14 and 15 respectively. The thickness of the coatings varied from about 0.85 mils to about 1.1 mils. After cooling to ambient temperature, the cured coatings were tested for the properties designated in Table II and the results of such testing are given in Table II.

TABLE II

| Example | 16 | 17 | 18 |
|---|---|---|---|
| Properties | | | |
| Double Acetone Rubs | 100(1) | 100(1) | 100(1) |
| Pencil Hardness | 4H | 4H | 4H |
| % Crosshatch Adhesion | 100 | 100 | 100 |
| Gardner Impact, in. lbs. | | | |
| Forward | 275 | 300 | 275 |
| Reverse | 225 | 275 | 225 |

The cured coatings were also immersed in water at ambient temperature for a period of 4 days. After 3.5 hours into the total 4 day immersion period, the cured coatings had 100% crosshatch adhesion and a 4H pencil hardness. After 3 days into the total 4 day immersion period, the cured coating of Example 18 had 100% crosshatch adhesion and a 4H pencil hardness. At the end of the 4 day immersion period, the cured coatings of Examples 16 and 17 had 20% and 97% crosshatch adhesion respectively and both had a 4H pencil hardness.

EXAMPLES 19 THROUGH 30

Into brown glass bottles under a yellow light source was added various specified combinations of Epoxide I, Epoxide IV, Photoinitiator I, Surfactant I, Polyol Adduct I, and Polyol Adduct II in the amounts specified for each example in Table III below. The contents in the bottles were thoroughly blended until homogeneous by simple stirring at ambient temperature.

TABLE III

| Example | 19 | 20 | 21 | 22 | 23 | 24 |
|---|---|---|---|---|---|---|
| Ingredients grams | | | | | | |
| Epoxide I | 21.38 | 20.13 | 18.88 | 18.88 | 21.38 | 20.13 |
| Epoxide IV | — | — | 1.25 | — | — | — |
| Photoinitiator I | 1.0 | 1.0 | 1.0 | 1.0 | 1.0 | 1.0 |
| Surfactant I | 0.13 | 0.13 | 0.13 | 0.13 | 0.13 | 0.13 |
| Polyol Adduct I | 2.50 | 3.75 | 3.75 | 5.0 | — | — |
| Polyol Adduct II | — | — | — | — | 2.50 | 3.75 |

The blended formulations were then applied to Bonderite 37 ® treated steel panels using a Number 20 wire-wound rod and cured with one pass under a 100 watt per inch, medium pressure, mercury lamp ultraviolet light source at 30 feet per minutes. One Bonderite 37 ® treated steel panel coated with the specified blended formulation was prepared for each example. The cured coatings on the Bonderite 37 ® treated steel panels of Examples 25 through 30 were prepared from the blended formulations of Examples 19 through 24 respectively. The thickness of the coatings varied from about 0.85 mils to about 1.1 mils. The cured coatings were tested for the properties designated in Table IV and the results of such testing are given in Table IV.

TABLE IV

| Example | 25 | 26 | 27 | 28 | 29 | 30 |
|---|---|---|---|---|---|---|
| Properties | | | | | | |
| Double Acetone Rubs | 100(1) | 100(2) | 100(1) | 30(4) | 100(1) | 75(4) |
| Pencil Hardness | 2H | 2H | 2H | H | H | 2H |
| % Crosshatch Adhesion | 100 | 100 | 100 | 100 | 100 | 100 |
| Gardner Impact, in. lbs. | | | | | | |
| Forward | 175 | >320 | >320 | >320 | 300 | >320 |
| Reverse | 75 | >320 | >320 | >320 | 300 | >320 |
| Water Immersion Resistance (3 hours at Room Temperature) | | | | | | |
| % Crosshatch Adhesion | 15 | 0 | 20 | 10 | 20 | 15 |
| Pencil Hardness | HB | 2B | HB | HB | 2B | B |

EXAMPLES 31 THROUGH 44

Examples 31 through 44 illustrate the utility of the low viscosity adducts of a polyether polyol and a polyepoxide in melamine (urea-formaldehyde) crosslinked systems. Into glass bottles was added various specified combinations of Melamine I, Polyol Adduct I, Polyol Adduct II, Polyol Adduct III, Catalyst II, Surfactant I, and Solvent I in the amounts specified for each example in Table V below. The contents in the bottles were thoroughly blended until homogeneous by simple stirring at a temperature of 40° C.-50° C.

TABLE V

| Example | 31 | 32 | 33 | 34 | 35 | 36 |
|---|---|---|---|---|---|---|
| Ingredients, grams | | | | | | |
| Melamine I | 6.0 | 6.5 | 6.5 | 7.0 | 6.0 | 7.0 |
| Polyol Adduct I | 9.05 | 9.05 | — | — | — | — |
| Polyol Adduct II | — | — | 12.25 | 12.25 | — | — |
| Polyol Adduct III | — | — | — | — | 12.43 | 12.43 |
| Catalyst II | 0.38 | 0.40 | 0.48 | 0.48 | 0.48 | 0.50 |
| Surfactant I | 0.08 | 0.08 | 0.09 | 0.10 | 0.09 | 0.10 |
| Solvent I | 8.98 | 9.23 | 11.4 | 11.63 | 11.28 | 11.75 |

The blended formulations were then applied to Bonderite 37 ® treated steel panels using a Number 60 wire-wound rod. The wet films of Examples 37 through 42 were air dried for about 5–10 minutes and cured in a forced-air oven at 130° C. for 30 minutes. The coatings of Examples 37 and 39 were further cured in a forced-air oven at 170° C. for an additional 20 minutes. The wet films of Examples 43 and 44 were air dried for about 5–10 minutes and cured in a forced-air oven at 170° C. for 20 minutes. One Bonderite 37 ® treated steel panel coated with the specified blended formulation was prepared for each example. The cured coatings on the Bonderite 37 ® treated steel panels of Examples 37 through 42 were prepared from the blended formulations of Examples 31 through 36 respectively. The cured coatings on the Bonderite ® treated steel panels of Examples 43 and 44 were prepared from the blended formulations of Examples 35 and 36 respectively. The thickness of the coatings varied from about 0.85 mils to about 1.1 mils. After cooling to ambient temperature, the cured coatings were tested for the properties designated in Table VI and the results of such testing are given in Table VI.

TABLE VI

| Example | 37 | 38 | 39 | 40 | 41 | 42 | 43 | 44 |
|---|---|---|---|---|---|---|---|---|
| Properties After 30 Minute, 130° C. Thermal Cure | | | | | | | | |
| Double Acetone Rubs | 100(1) | 100(1) | 100(1) | 100(1) | 14(4) | 60(4) | — | — |
| Pencil Hardness | H | H | 3B | 3B | <6B | 5B | — | — |
| % Crosshatch Adhesion | 0 | 0 | 0 | 0 | 100 | 96 | — | — |
| Gardner Impact, in. lbs. | | | | | | | | |
| Forward | 50 | 50 | 50 | 75 | 50 | 25 | — | — |
| Reverse | <5 | <5 | 25 | 25 | 15 | <5 | — | — |
| Properties After Additional 20 Minute, 170° C. Thermal Cure | | | | | | | | |
| % Crosshatch Adhesion | 100 | — | 100 | — | — | — | — | — |
| Properties After 20 Minute, 170° C. Thermal Cure | | | | | | | | |
| Double Acetone Rubs | — | — | — | — | — | — | 100(1) | 100(2) |
| Pencil Hardness | — | — | — | — | — | — | 5B | 5B |
| % Crosshatch Adhesion | — | — | — | — | — | — | 100 | 100 |
| Gardner Impact, in. lbs. | | | | | | | | |
| Forward | — | — | — | — | — | — | 25 | 25 |
| Reverse | — | — | — | — | — | — | <5 | <5 |

I claim:

1. An adduct of a poly(active hydrogen) organic compound and a polyepoxide comprising the reaction product of a poly(active hydrogen) organic compound and a polyepoxide containing two or more epoxy groups per molecule in a molar ratio of poly(active hydrogen) organic compound to polyepoxide of about 2:1 to about 3:1, said adduct having an oxirane content of less than about 0.05 percent and a viscosity of less than about 3500 centistokes at 54.5° C.

2. An adduct as defined in claim 1 wherein the poly(active hydrogen) organic compound is a polyester polyol.

3. An adduct as defined in claim 1 wherein the poly(active hydrogen) organic compound is a polyester polyol.

4. An adduct as defined in claim 1 wherein the poly(active hydrogen) organic compound is a mixture of at least two polyether polyols.

5. An adduct as defined in claim 1 wherein the poly(active hydrogen) organic compound is a mixture of at least two polyester polyols.

6. An adduct as defined in claim 1 wherein the polyepoxide containing two or more epoxy groups per molecule is a cycloaliphatic epoxide.

7. An adduct as defined in claim 6 wherein the cycloaliphatic epoxide has the formula:

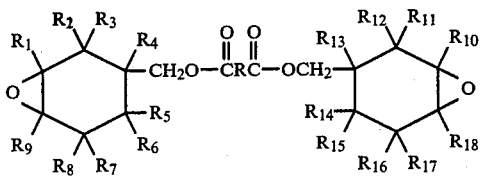

wherein $R_1$ through $R_{18}$, which can be the same or different, are hydrogen or alkyl radicals generally containing one to nine carbon atoms inclusive; R is a valence bond or a divalent hydrocarbon radical generally containing one to twenty carbon atoms inclusive.

8. An adduct as defined in claim 6 wherein the cycloaliphatic epoxide has the formula:

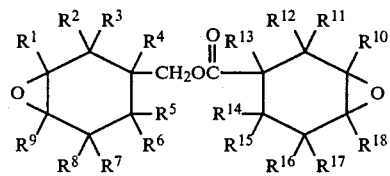

wherein $R^1$ through $R^{18}$, which can be the same or different are hydrogen or alkyl radicals generally containing one to nine carbon atoms inclusive.

9. An adduct as defined in claim 6 wherein the cycloaliphatic epoxide has the formula:

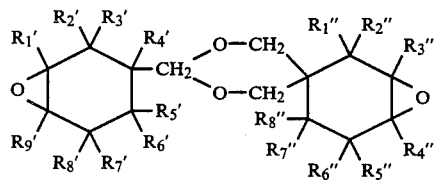

wherein the R prime and double prime groups are the same or different and are monovalent substituents or monovalent hydrocarbon radicals.

10. An adduct as defined in claim 6 wherein the cycloaliphatic epoxide is 3,4-epoxycyclohexylmethyl-3,4-epoxycyclohexane carboxylate.

11. An adduct as defined in claim 6 wherein the cycloaliphatic epoxide is bis (3,4-epoxycyclohexylmethyl) adipate.

12. An adduct as defined in claim 6 wherein the cycloaliphatic epoxide is vinylcyclohexene diepoxide.

13. An adduct as defined in claim 1 wherein the polyepoxide containing two or more epoxy groups per molecule is a polyglycidyl epoxide.

14. An adduct as defined in claim 13 wherein the polyglycidyl epoxide is a diglycidyl ether of Bisphenol A.

15. An adduct as defined in claim 1 wherein the polyepoxide containing two or more epoxy groups per molecule is a mixture of a cycloaliphatic epoxide and a polyglycidyl epoxide.

16. An adduct as defined in claim 1 having an oxirane content of less than about 0.025 percent and a viscosity of less than about 3000 centistokes at 54.5° C.

17. An adduct as defined in claim 1 having an oxirane content of less than about 0.025 percent and a viscosity of less than about 1000 centistokes at 54.5° C.

18. A process for preparing a low viscosity adduct of a poly(active hydrogen) organic compound and a polyepoxide which process comprises reacting a poly(active hydrogen) organic compound and a polyepoxide containing two or more epoxy groups per molecule in the presence of a sulfonic acid catalyst or derivative thereof at a temperature of from about 80° C. to about 225° C., said poly(active hydrogen) organic compound, polyepoxide and sulfonic acid catalyst or derivative thereof being employed in an amount at least sufficient to effect substantially complete reaction of the epoxy groups of the polyepoxide in a sufficiently short period of time whereby to minimize the formation of a high viscosity product.

19. A process as defined in claim 18 wherein the poly(active hydrogen) organic compound is a polyether polyol.

20. A process as defined in claim 18 wherein the poly(active hydrogen) organic compound is a polyester polyol.

21. A process as defined in claim 18 wherein the poly(active hydrogen) organic compound is a mixture of at least two polyether polyols.

22. A process as defined in claim 18 wherein the poly(active hydrogen) organic compound is a mixture of at least two polyester polyols.

23. A process as defined in claim 18 wherein the polyepoxide containing two or more epoxy groups per molecule is a cycloaliphatic epoxide.

24. A process as defined in claim 23 wherein the cycloaliphatic epoxide has the formula:

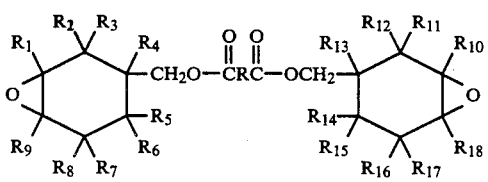

wherein $R_1$ through $R_{18}$, which can be the same or different, are hydrogen or alkyl radicals generally containing one to nine carbon atoms inclusive, R is a valence bond or a divalent hydrocarbon radical generally containing one to twenty carbon atoms inclusive.

25. A process as defined in claim 23 wherein the cycloaliphatic epoxide has the formula:

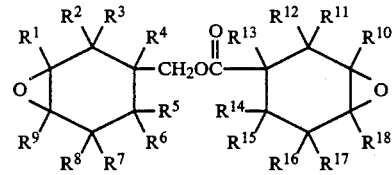

wherein $R^1$ through $R^{18}$ which can be the same or different are hydrogen or alkyl radicals generally containing one to nine carbon atoms inclusive.

26. A process as defined in claim 23 wherein the cycloaliphatic epoxide has the formula:

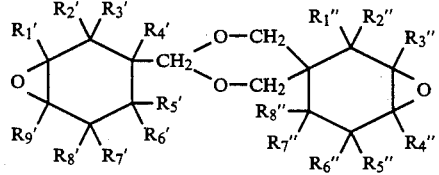

wherein the R prime and double prime groups are the same or different and are monovalent substituents or monovalent hydrocarbon radicals.

27. A process as defined in claim 23 wherein the cycloaliphatic epoxide is 3,4-epoxycyclohexylmethyl-3,4-epoxycyclohexane carboxylate.

28. A process as defined in claim 23 wherein the cycloaliphatic epoxide is bis (3,4-epoxycyclohexylmethyl) adipate.

29. A process as defined in claim 23 wherein the cycloaliphatic epoxide is vinylcyclohexene diepoxide.

30. A process as defined in claim 18 wherein the polyepoxide containing two or more epoxy groups per molecule is a polyglycidyl epoxide.

31. A process as defined in claim 30 wherein the polyglycidyl epoxide is a diglycidyl ether of Bisphenol A.

32. A process as defined in claim 18 wherein the polyepoxide containing two or more epoxy groups per molecule is a mixture of a cycloaliphatic epoxide and a polyglycidyl epoxide.

33. A process as defined in claim 18 wherein the poly(active hydrogen) organic compound and polyepoxide containing two or more epoxy groups per molecule are present in a molar ratio of poly(active hydrogen) organic compound to polyepoxide of from about 2:1 to about 3:1.

34. A process as defined in claim 18 wherein the sulfonic acid catalyst or derivative thereof has the formula:

$$(R_f SO_3)_n M$$

wherein $R_f$ is fluoroalkyl having from 1 to 18 carbon atoms, M is ammonium cation quaternary ammonium cation, cation of amine or cation of metal selected from Groups I to V and VIII, subgroups VI-B and VII-B, and lanthanide and actinide series of metals of and Periodic Table, and n is an integer equal to the valence of M.

35. A process as defined in claim 34 wherein the sulfonic acid catyst or derivative thereof is trifluoromethanesulfonic acid.

36. A process as defined in claim 34 wherein the sulfonic acid catalyst or derivative thereof is diethylammonium triflate.

37. A process as defined in claim 18 wherein the sulfonic acid catalyst or derivative thereof is present in an amount of from about 0.0001 weight percent to about 1.0 weight percent based on the total charge of ingredients.

38. A process as defined in claim 18 wherein the reaction time period is less than about 6 hours.

39. An adduct of a poly(active hydrogen) organic compound and a polyepoxide prepared by the process of claim 18.

* * * * *

UNITED STATES PATENT AND TRADEMARK OFFICE
CERTIFICATE OF CORRECTION

PATENT NO. : 4,707,535
DATED : November 17, 1987
INVENTOR(S) : J. V. Koleske

It is certified that error appears in the above-identified patent and that said Letters Patent is hereby corrected as shown below:

Column 4, line 30, delete from "and" through "compounds" in column 4, line 32. Column 4, line 33, "othe rdialdehydes" should read -- other dialdehydes --.

Column 4, line 47,: delete the closing parenthesis.

Column 5, line 53,: add a space between "$R^{10}$" and "is".

Column 10, line 50,: formula should read "$C_4F_9CFHCF_2SO_3H$".

Column 10, line 51,: in the formula, "Cll" should be -- $C_{11}$ --.

Column 17, line 67,: change "weight" to -- weighed --.

Column 22, line 19,: change "gram" to -- grams --.

Column 34, line 5,: change "polyester" to -- polyether --.

Signed and Sealed this

Twelfth Day of September, 1989

*Attest:*

DONALD J. QUIGG

*Attesting Officer*  *Commissioner of Patents and Trademarks*